May 19, 1931.   J. V. GIESLER   1,806,393
RADIATOR CONTROLLING MECHANISM
Filed Nov. 27, 1926   4 Sheets-Sheet 4

Inventor
Jean V. Giesler
By
Cameron, Kerkam & Sutton.
Attorneys

Patented May 19, 1931

1,806,393

UNITED STATES PATENT OFFICE

JEAN V. GIESLER, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE

RADIATOR CONTROLLING MECHANISM

Application filed November 27, 1926. Serial No. 151,216.

This invention relates to a method and means for controlling the flow of heating medium through a radiator, and particularly to a method and means for thermostatically varying the flow of heating medium in response to variations of temperature at the outlet of the radiator.

It has heretofore been the practice to provide a steam or vapor heating radiator with a trap at its outlet end, including a thermostat which is designed to contract and open the outlet, to permit the escape of condensate, when cooled by the contact of the condensate therewith, and to expand and close the outlet, to prevent the escape of steam or vapor, upon contact of the latter therewith. Devices of this character, however, are subject to the variations in the pressure of the steam or vapor, while, as is well recognized, it is extremely difficult, if possible, to maintain a uniform pressure of the steam or vapor. Hence the operation of the thermostat is not only modified by the variations in the pressure to which it is subjected, but the thermostat is sometimes subjected to a pressure which injures or destroys the same.

It has also been proposed to position a thermostat in or adjacent to the outlet of the radiator and connect the same to a valve in the inlet to the radiator, the thermostat contracting to open the inlet valve and expanding to close the inlet valve. Here again, however, the thermostat has been periodically subjected to the entire pressure of the steam or vapor and not only has the thermostat been forced to operate under varying pressures, but it is sometimes subjected to a pressure which is harmful to its operation.

It is an object of this invention to provide a method and means for controlling the flow of heating medium through a radiator whereby the pressure in the radiator may be maintained substantially uniform and the flow of the heating medium through the radiator be determined from the temperature of the condensate flowing therefrom, taking advantage of the fact that the temperature of the condensate will vary with the pressure of the heating medium.

Another object of the present invention is to provide a method and means of the character referred to whereby the heating medium is continuously admitted to the radiator under the control of the temperature of the condensate flowing from the radiator, whereby the temperature within the radiator may be maintained substantially uniform by varying, without interrupting, the admission of the heating medium under the control of the temperature of the condensate flowing therefrom.

Another object of this invention is to provide a method and means of the character described which will eliminate the necessity for a pressure reducing valve between the source of heating medium and the radiator, as is commonly used where the pressure of the heating medium at the source is above that desirable for use in the radiator.

Another object of this invention is to provide a method and means of the character described whereby the pressure to be maintained in the radiator may be varied by a preliminary setting of the apparatus employed.

Another object of this invention is to provide a method and means of the character described whereby the control of the heating medium may be made independent of any fluctuations in the pressure at the outlet side of the radiator or in the return line.

Another object of the present invention is to provide radiator control mechanism which is simple in construction, rugged and durable in operation, relatively inexpensive to manufacture and install and efficient in service. Other objects will appear as the description of the invention proceeds.

The invention is capable of being carried out in a variety of ways and of being embodied in a variety of mechanism constructions, some of which are shown on the accompanying drawings, but it is to be expressly understood that the drawings are for purposes of illustration only and are not to be construed as a definition of the limits of the invention, reference being had to the appended claims for that purpose.

Referring to the drawings wherein the same reference characters are employed to designate corresponding parts in the several figures, Fig. 1 is a sectional elevation of an embodiment of the present invention;

Figure 1:
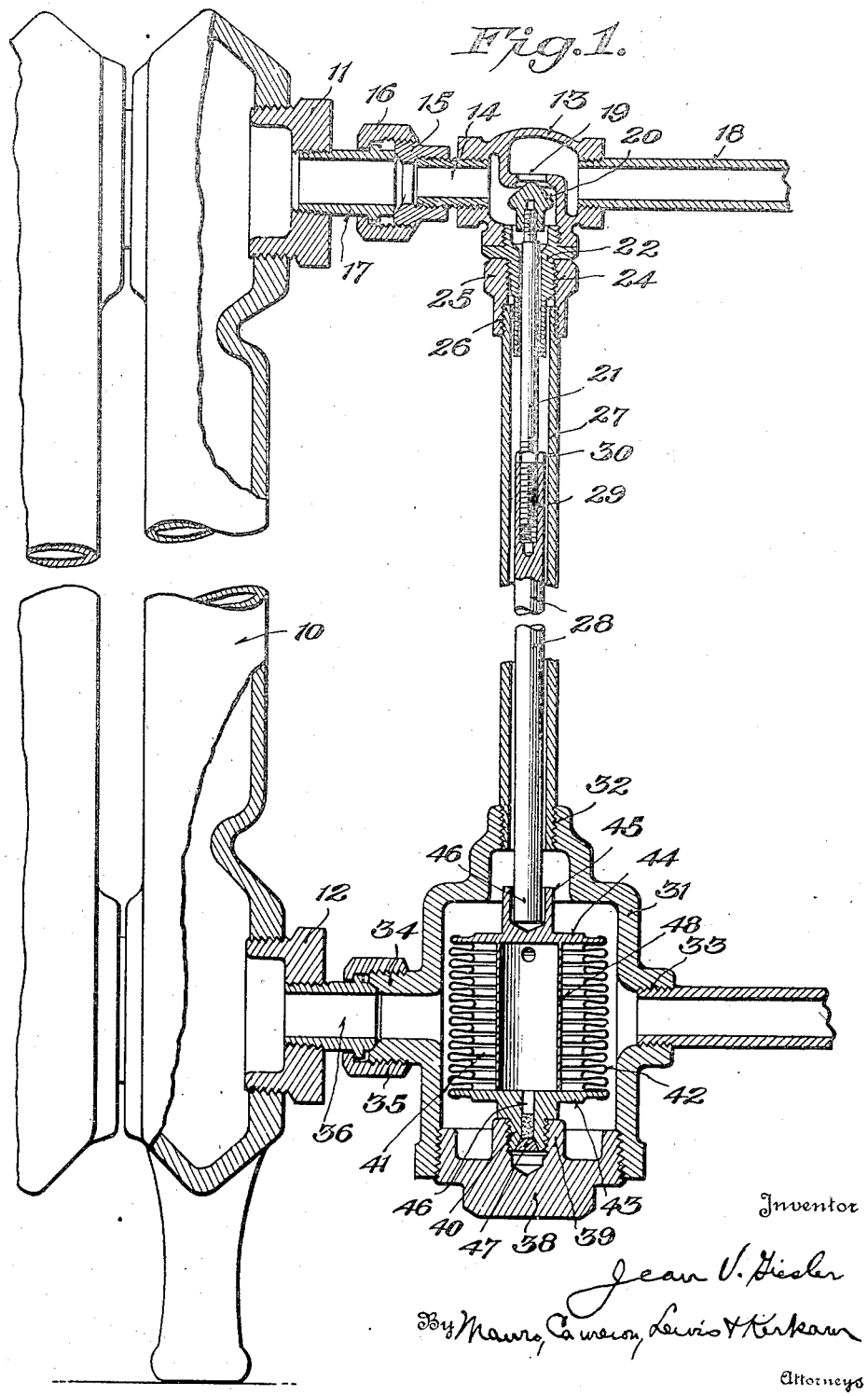

In the form shown in Fig. 1, 10 is a radiator of any suitable form, construction and material, said radiator having bushings 11 and 12, at its inlet and outlet ends respectively, for the connection of the inlet and outlet conduits. The inlet conduit is provided with a valve casing 13 of any suitable construction, said valve casing being shown as connected to the bushing 11 by a nipple 14, union 15, tail nut 16 and tail piece 17. An inlet pipe 18 leads to said valve casing 13 from any suitable source of heating medium, such as steam, vapor, etc. Interiorly said valve casing 13 is provided with a valve port 19 with which cooperates a valve member 20 of any suitable type and construction. While a seating valve of simple form has been shown, it is to be expressly understood that the valve mechanism illustrated and its connections are to be taken as typical of any suitable construction and arrangement for controlling the admission of the heating medium to the radiator.

In the form shown, valve member 20 is suitably mounted on a valve stem 21 which extends through an aperture in the valve bonnet 22, said bonnet being suitably mounted on the casing 13 as by a threaded connection. Said bonnet is shown as provided with an elongated tubular guide portion 23 for the valve stem 21 and as exteriorly threaded at 24 to receive and retain a nut 25, interiorly threaded at 26 to receive and retain an elongated tubular guide member 27 which extends to the thermostat casing in the outlet connections, as will be presently described. Mounted for reciprocatory movement within said tube 27 is a rod 28 which is suitably connected to the valve stem 21 as by the threaded connection shown at 29 so as to permit a preliminary adjustment of the length of the connections 21, 28 in conformity with the distance between the inlet and the outlet connections, said preliminary adjustment being then retained by a lock nut 30.

Mounted in the outlet connections is a thermostat casing 31 of any suitable form and construction, the same being shown as having an interiorly threaded aperture 32 to receive the threaded end of the tube 27, an interiorly threaded aperture 33 to receive the outlet pipe, a threaded boss 34 whereby said casing may be connected with the bushing 12 by tail nut 35 and tail piece 36, and a large interiorly threaded aperture to receive the thermostat carrying plug 38. Plug 38 on its inner side has an interiorly threaded boss 39 to receive a threaded boss 40 on the thermostat 41. Thermostat 41 may be of any suitable type and construction, being shown as composed of a deeply corrugated, highly flexible tubular metal wall 42, preferably of resilient metal, suitably attached at its opposite ends, as by welding or soldering, to a stationary end wall 43, which may be formed integrally with the threaded boss 40, and a movable end wall 44 which is provided with a tubular socket 45 to receive the end of the extension 28 on the valve stem 21. The thermostat 41 is charged with a thermosensitive fluid, preferably a volatile liquid, a filling opening 46 closed by a stopper or solder 47 being shown as extending through the boss 40 and stationary end wall 43. A tubular stop 48 is also preferably provided within said thermostat to limit its contraction, said stop being shown as suitably attached, as by solder, to the movable end wall 44, although it may be integrally formed or otherwise mounted on either of the thermostat walls.

In operation, assuming that the thermostat has been charged so that it will expand at a predetermined temperature, which will preferably be a temperature just below the boiling point of the medium at the pressure existing in the return line, when the radiator is cold and steam or vapor is first admitted thereto, the thermostat 41 is contracted and the valve member 20 is in its wide open position. The entering steam or vapor will force the air through the outlet of the radiator and over the thermostat into the return line. The steam or vapor entering the radiator will gradually condense and the temperature of the radiator will increase, the temperature of the condensate increasing until it reaches that temperature at which the thermostat is designed to become operative. When the condensate reaches this temperature the thermostat begins to expand and the movable end wall 44 exerts a thrust on the valve stem extension 28 and valve stem 21 to move the valve member 20 toward closed position, thereby reducing the admission of the steam or vapor by throttling the inlet to the radiator. This will continue until the admission of steam or vapor at the then existing pressure is just sufficient to maintain the predetermined temperature of the condensate flowing over the thermostat 41. If for any reason the steam pressure increases or decreases, which will cause a change in the temperature of the condensate, the thermostat 41 immediately responds to the change in temperature and repositions the valve member 20 so that at the new pressure the quantity of steam or vapor entering the radiator is that required to maintain the condensate at the predetermined temperature.

It will therefore be perceived that the radiator is caused to operate at a substantially uniform temperature, and this temperature is maintained independently of any variation that may occur in the pressure of the heating medium supplied to the radiator. At the same time, the thermostatically controlled mechanism operates as its own pressure reducing valve so that it is unnecessary to employ an additional valve of this character.

Figure 2:
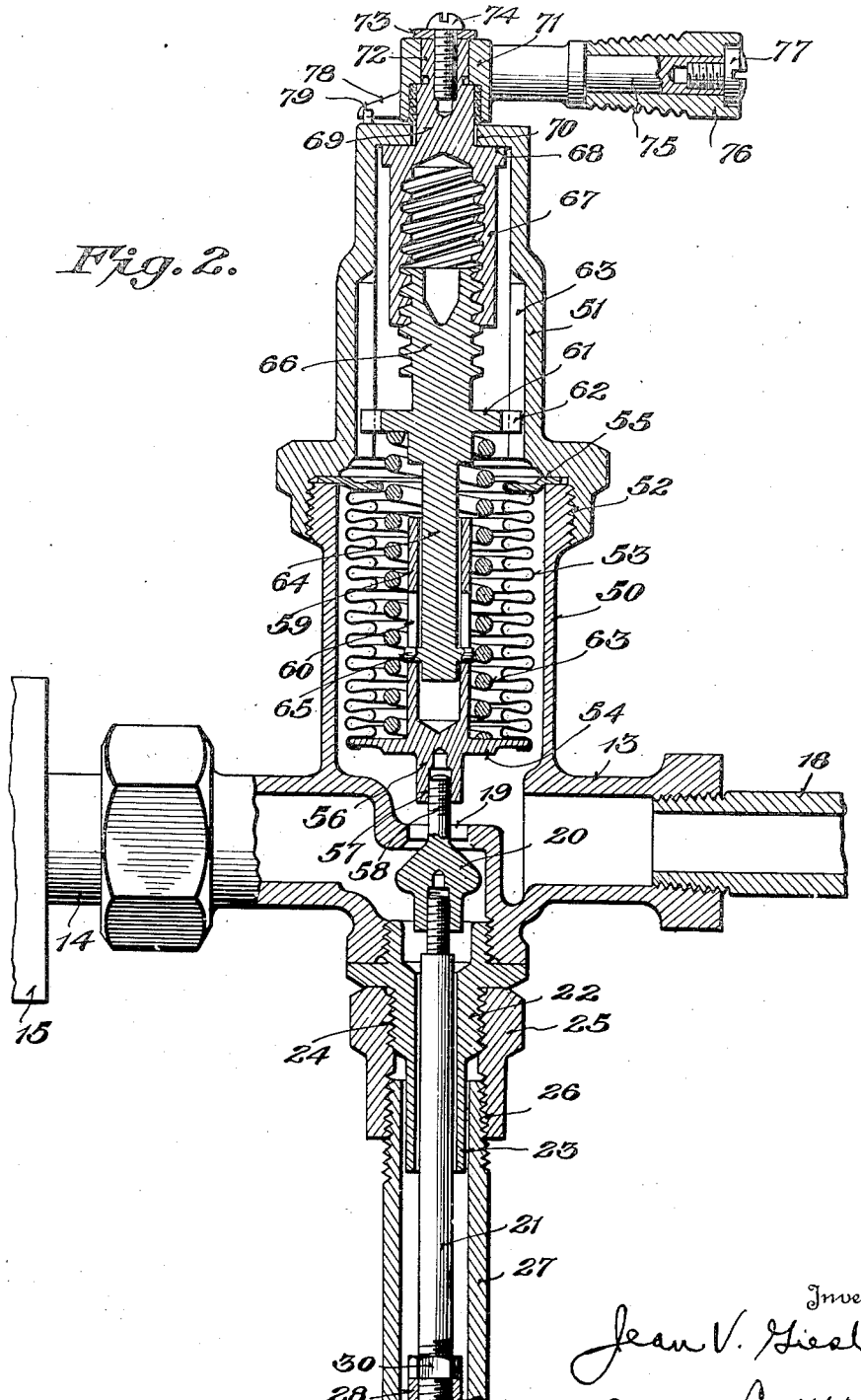
Fig. 2 is a sectional elevation on an enlarged scale of another embodiment including means for adjusting the temperature and pressure to be maintained.
Figure 4:
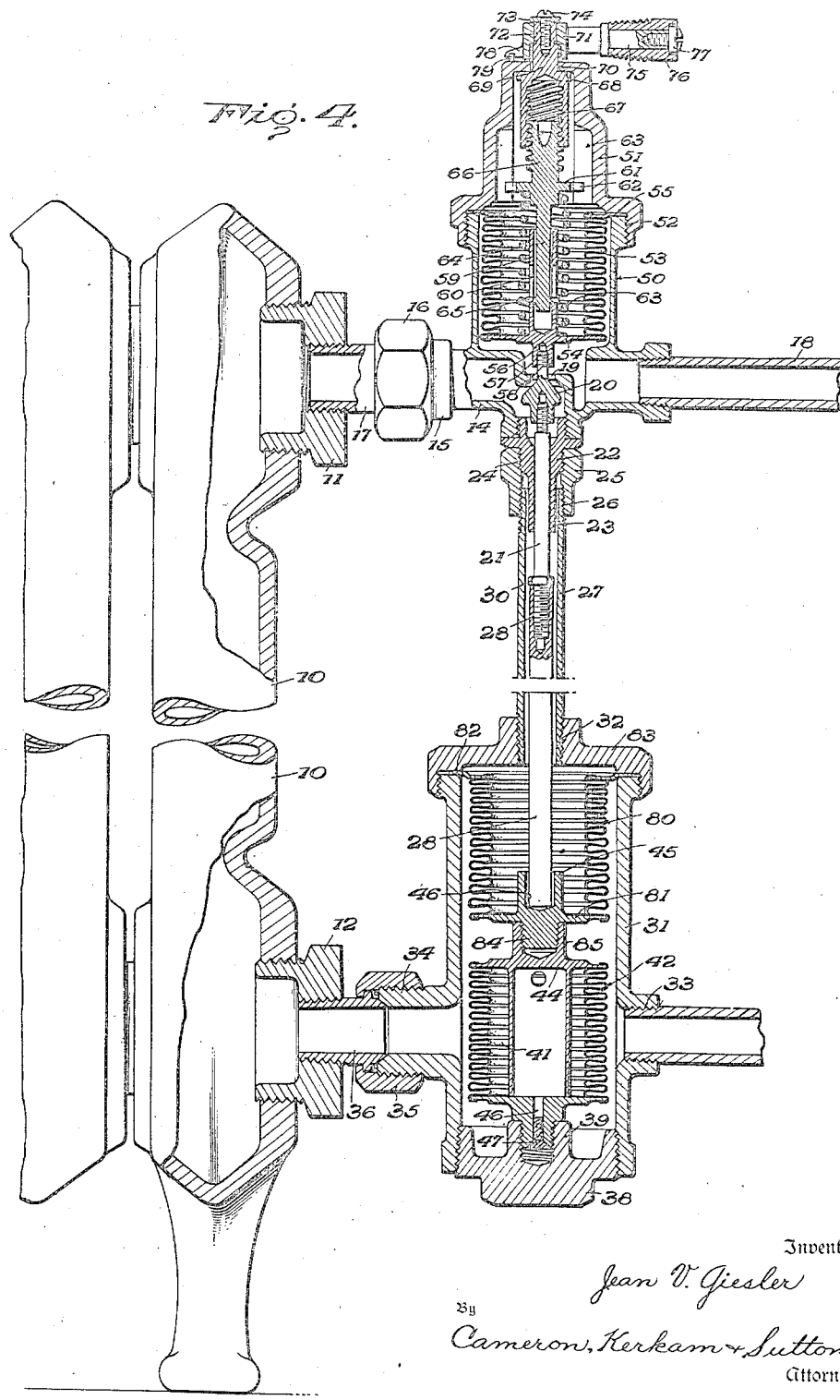
Fig. 4 is a sectional elevation of an embodiment of the present invention employing the structures shown in Figs. 2 and 3.

It is frequently desirable to vary the temperature to be maintained in the radiator, and to this end the embodiment of Figs. 2 and 4 includes a manual adjusting device for predetermining the temperature to be maintained. In the form here shown, the valve casing 13 is provided with a tubular extension 50 which carries a bonnet member 51 suitably attached thereto as by screw threads 52. Mounted within said extension 50 is a deeply corrugated, highly flexible, expansible and collapsible tubular metal wall 53 suitably attached at its opposite ends, as by soldering or brazing, to a movable end wall 54 and a stationary end wall 55, the latter taking the form of an exteriorly projecting flange. Said stationary end wall or flange 55 is fixedly mounted in position in any suitable way, as by clamping the same between the end of the tubular extension 50 and an opposed surface on the bonnet member 51. The movable end wall 54 has an exteriorly projecting tubular extension 56, formed integrally therewith or suitably attached thereto, said extension being internally threaded at 57 to receive a threaded extension or boss 58 on the valve member 20. Interiorly, said movable end wall 54 is provided, integrally therewith or suitably attached thereto, with an elongated tubular extension 59 which has diametrically opposed slots 60 for a purpose to be described.

Slidably mounted within the bonnet member 51 is a plate 61, shown as provided with opposed lugs 62 adapted to slide in longitudinally extending grooves 63 in said bonnet member, or the said plate 61 may be grooved to receive longitudinally extending ribs on said bonnet member. Thereby said plate 61 may slide lengthwise of said bonnet member but may not rotate with respect thereto. Interposed between said plate 61 and the movable end wall 54 is a coil spring 63 which reacts between said members. Plate 61 is also provided, either integrally therewith or suitably attached thereto, with a stem 64 which is slidably received within the tubular member 59 and which carries adjacent its end a transverse pin 65 which is slidably received within the slots 60. Also carried by said plate 61 and preferably formed integrally therewith, although the same may be suitably attached thereto, is an exteriorly threaded stem 66 which coacts with an interiorly threaded sleeve-like nut 67 that is provided with a shoulder 68 and a reduced portion 69 which projects through an aperture 70 in the end of the bonnet member 51. The screw threads on the stem 66 and sleeve-like nut 67 are preferably of a multiple or high pitched type so that one revolution of the sleeve-like nut will produce a relatively large longitudinal movement of the threaded stem 66.

Said sleeve-like nut 67 is rotatably mounted in the aperture 70, and retained with its shoulder 68 against the inner face of the end of the bonnet member 51 by a handle member of any suitable construction, shown as comprising a hub 71 that is mounted on the reduced extremity 72 of the extension 69 and retained thereon, in non-rotatable relation thereto, by a washer 73 and screw 74. Said hub 71 has a shank 75 on which is suitably mounted a hand grasp 76 of any suitable character and construction and retained thereon by a screw 77. Hub 71 may also be provided with a projection 78 which constitutes a pointer that may cooperate with any suitable indications marked on the end surface of the bonnet 51, or a suitable index plate carried thereby, and said projection may also cooperate with a lug 79 to constitute a stop to limit the rotation of said manual operating means.

In operation the manually operable member 71, 76 may be rotated through nearly 360° to rotate the sleeve-like nut 67. By the coaction of the threads on said sleeve-like nut 67 and the threaded stem 66, the latter is caused to move rectilinearily in an axial direction, rotation of said stem 66 being prevented by the coaction of the plate 61 with the walls of the bonnet member 51. This movement of plate 61 increases or decreases the tension of the coil spring 63 which acts in opposition, through its pressure on the movable end wall 54, to the closing movement of the valve member 20, the flexible wall 53 acting as a substitute for packing and preventing the escape of the heating medium around the manually adjustable device just described. As the tension of the spring is increased, the pressure which must be developed by the thermostat in order to move the valve toward closing position is increased and therefore a higher temperature must exist at the thermostat before the valve is moved toward closing position. On the other hand, if the tension of the spring is decreased the valve member may be moved toward closing position by the existence of a smaller pressure at the thermostat, and therefore the valve member will be moved toward closing position when a lower temperature is reached at the thermostat. Therefore, by rotating the manually operable member to variously tension the spring 63 the apparatus may be adjusted so as to predetermine the temperature to be maintained in the radiator, and after this temperature is thus predetermined the device will operate as described in conjunction with the embodiment of Fig. 1 to maintain a predetermined temperature of the condensate leaving the radiator notwithstanding variations in the pressure of the heating medium supplied to the radiator. By thus varying the temperature of the condensate leaving the radiator and maintaining said temperature substantially uniform, the mean temperature of the radiator may be maintained substantially uniform and at the same time be predetermined by the manually adjustable mechanism just described.

During substantially the entire stroke of the threaded stem 66 the transverse pin 65 in steam 64 is sliding in the slots 60, but just as the pointer 78 approaches the stop 79 so as to limit the upward movement of the stem 64, by reason of its actuation through the sleeve-like nut 67 and stem 66, transverse pin 65 engages the end of the slots in the tubular member 59 and positively moves the movable end wall 54, and the valve member 20 attached thereto so as to engage the latter with its seat. The adjusting mechanism heretofore described may therefore be additionally used as an inlet valve for shutting off the admission of heating medium when desired.

It will, therefore, be perceived that by the use of this embodiment of the invention, not only will the control of the radiator be effected from the temperature of the condensate and thereby be entirely independent of the pressure of the heating medium, but the effective capacity of the radiator may be adjusted and maintained so as to obtain the desired heating effect. Thus the manually adjustable mechanism described may be so designed that when the manually adjustable mechanism is in one extreme position the entire radiator will be heated, while in the intermediate positions of said mechanism only predetermined portions of the radiator will be heated, and this predetermination of the extent of the radiator to be effective will be maintained notwithstanding fluctuations in the pressure of the heating medium, because of the response of the thermostat to fluctuations in the temperature of the condensate to follow the fluctuations in the pressure of the heating medium.

It is sometimes desirable to render the thermostatic control as heretofore described independent of any fluctuation of the pressure in the outlet or return line, especially in vacuum systems where a substantial change in the vacuum would vary the exterior pressure on the thermostat and thereby modify its action. This can be avoided by use of the construction shown in Figs. 3 and 4. As here shown, the thermostat housing 31 is increased in length and mounted within said casing, in axial relation to the thermostat 41, is a second deeply corrugated, highly flexible, expansible and collapsible tubular metal wall 80 suitably attached, as by brazing or soldering, to a movable end wall 81 and a stationary end wall 82 which takes the form of an outwardly directed flange that may be clamped fixedly in position between the end of the housing 31 and the cap nut 83 which closes the end of said housing. The movable end wall 81 is suitably attached to the movable end wall 44 of the thermostat 41 as by a threaded boss 84 on the wall 81 received within a threaded sleeve 85 on the wall 44. Interiorly, said wall 81 is provided with a socket 86 for receiving the end 46 of the extension 28 of the valve stem 21. The mean effective area of the corrugated flexible wall 80 with its end wall 81 is made the same as the mean effective area of the corrugated lateral wall and movable end wall of the thermostat, so that the mean effective areas of the two opposed expansible and contractible elements are the same. As these two elements are exposed to the same pressure and act in opposition to each other, as well as have the same mean effective area, any fluctuation in the pressure in the return line or the outlet of the radiator acts equally and oppositely on the two expansible and contractible elements and therefore eliminates the effect of such change of pressure on the action of the thermostat 41.

Figure 3:
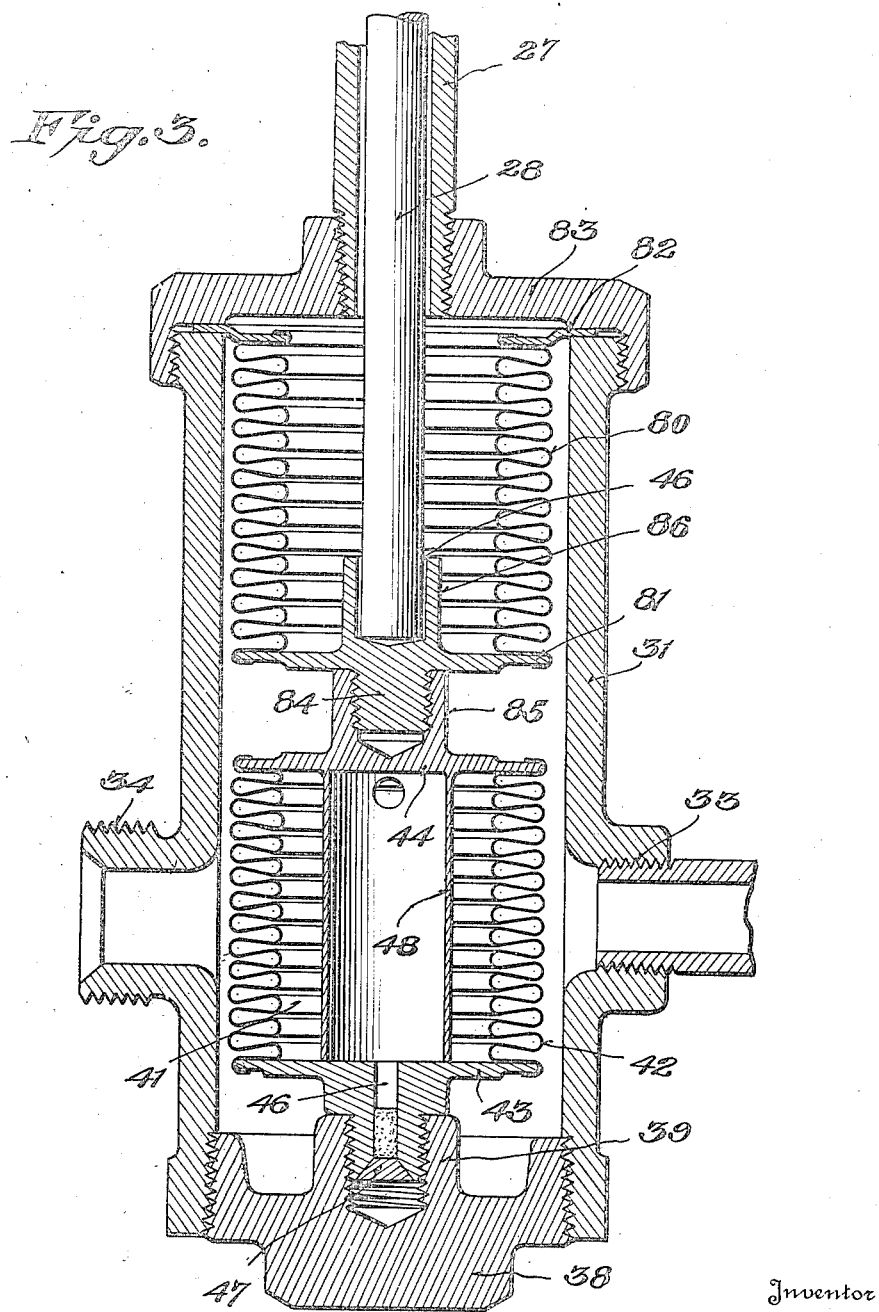
Fig. 3 is a sectional elevation on a further enlarged scale of another embodiment including means for rendering the thermostat independent of any fluctuations of pressure in the outlet or return line of the radiator.

It is to be expressly understood that either, or both, or neither of the refinments constituted by the constructions illustrated in Figs. 2 and 3 may be used with embodiments of the invention as typified by the construction shown in Fig. 1.

It will therefore be perceived that means have been provided for maintaining a predetermined temperature in the radiator by subjecting the controlling means to the pressure in the return line and regulating the flow of heating medium to the radiator from the temperature of the condensation. Thereby the temperature to be maintained is made independent of the pressure of the heating medium and at the same time the present invention eliminates the necessity for a pressure reducing valve in the feed line to the radiator. Furthermore, according to the present invention, the temperature to be maintained may be adjusted or the effect of fluctuations in the return line may be eliminated, or both, when desired. Inasmuch as the regulation of the quantity of heating medium flowing through the radiator takes place at the inlet, the outlet opening of the radiator may be made as large as desirable, so that the outlet connections may be kept free of scale, dirt and grit. Additionally, the controlling mechanism provided is simple and rugged in construction, relatively inexpensive to manufacture and install and efficient in operation.

While the embodiments of the invention illustrated on the drawings have been described with considerable particularity it is to be expressly understood that the invention is not restricted thereto, as the invention is capable of being carried out in a variety of ways and of receiving a variety of mechanical expressions, some of which will now readily suggest themselves to those skilled in the art, while changes may be made in the details of construction, arrangement and proportion of parts of the apparatus without departing from the spirit of this invention. Reference is therefore to be had to the claims hereto appended for a definition of the limits of said invention.

What is claimed is:

1. In a radiator controlling mechanism, in combination with a radiator having a constantly open outlet, a vapor pressure thermostat controlled by the temperature of the condensate flowing through said outlet, a housing for said thermostat located adjacent to and in open communication with the outlet of said radiator, a throttling valve in the inlet to said radiator, operative connections extending from said inlet valve to said thermostat and manually operable means including said operative connections for varying the pressure on said thermostat.

2. In a radiator controlling mechanism, in combination with a radiator, a normally open valve for reducing the pressure of the heating medium, temperature responsive means also responsive to pressure variations within the outlet of said radiator and exposed to and controlled by the temperature of the condensate of said heating medium for varying said valve to maintain a predetermined pressure within the radiator and means to prevent variations of pressure in the outlet of the radiator from affecting the operation of said means for varying the valve.

3. In a radiator controlling mechanism, in combination with a radiator, a thermostat subjected to and controlled by the temperature of the condensate flowing through the outlet of the radiator, a throttling valve in the inlet to said radiator, means for manually operating said valve, connections between said thermostat and valve, and a spring for opposing the closing movement of said valve, said manual means being also operative for adjusting the tension of said spring.

4. In a radiator controlling mechanism, in combination with a radiator, a thermostat controlled by the temperature of the condensate flowing through the outlet of the radiator, a throttling valve in the inlet to said radiator, connections between said thermostat and valve, a manually operable device associated with said valve, a flexible partition between said device and the inlet passage, and means associated with said manual device for predetermining the pressure of the heating medium to be maintained in said radiator.

5. In a radiator controlling mechanism, in combination with a radiator, a thermostat controlled by the temperature of the condensate flowing through the outlet of the radiator, a throttling valve in the inlet to said radiator, connections between said thermostat and valve, means for adjusting the actuation of said valve by said thermostat, and means whereby said last named means may be also employed to open and close said valve.

6. In a radiator controlling mechanism, in combination with a radiator, a vapor pressure thermostat subjected to the temperature of the condensate flowing from the outlet of the radiator, a throttling valve in the inlet to said radiator operatively connected to said thermostat, and means coacting with said thermostat whereby the latter is unresponsive to variations of pressure in the outlet of the radiator.

7. In a radiator controlling mechanism, in combination with a radiator, a thermostat subjected to the temperature of the condensate flowing from the outlet of the radiator, a throttling valve in the inlet to said radiator operatively connected to said thermostat, and an element connected in opposition to said thermostat and having the same mean effective area as said thermostat for rendering said thermostat unresponsive to variations of pressure.

8. In a radiator controlling mechanism, in combination with a radiator, a vapor pressure thermostat subjected to the temperature of the condensate flowing from the outlet of the radiator, a throttling valve in the inlet to said radiator operatively connected to said thermostat, means in the outlet of the radiator for rendering said thermostat unresponsive to variations of pressure in said outlet and a manually operable device associated with said thermostatically controlled valve for imposing varying degrees of pressure on said thermostat.

9. In a radiator controlling mechanism, in combination with a radiator, a thermostat subjected to and controlled by only the temperature of the condensate flowing through the outlet of the radiator, a throttling valve in the inlet to said radiator operatively connected to said thermostat, an expansible and collapsible member having a movable end wall forming a fluid-tight partition for preventing the escape of the heating medium, said movable end wall being operatively connected to said valve, and an adjustable spring coacting with said movable end wall.

In testimony whereof I have signed this specification.

JEAN V. GIESLER.